United States Patent [19]

Dickinson

[11] 4,174,640

[45] Nov. 20, 1979

[54] TRACTION-DRIVE TRANSMISSION

[75] Inventor: Thorn W. Dickinson, Berlin, Conn.

[73] Assignee: Textron Inc., Providence, R.I.

[21] Appl. No.: 831,934

[22] Filed: Sep. 9, 1977

[51] Int. Cl.² ............................................. F16H 37/06
[52] U.S. Cl. ............................................ 74/690; 74/199
[58] Field of Search .................................. 74/690, 199

[56] References Cited

U.S. PATENT DOCUMENTS

| 1,136,690 | 4/1915 | Martins | 74/690 |
| 3,365,982 | 1/1968 | Floyd | 74/690 |
| 4,098,146 | 7/1978 | McLarty | 74/690 |

FOREIGN PATENT DOCUMENTS

| 11326 | 11/1902 | Austria | |
| 379893 | 4/1940 | Italy | 74/199 |
| 323099 | 7/1957 | Switzerland | 74/199 |

Primary Examiner—Carroll B. Dority, Jr.
Assistant Examiner—W. Henderson
Attorney, Agent, or Firm—Hopgood, Calimafde, Kalil, Blaustein & Lieberman

[57] ABSTRACT

The invention contemplates an improved traction-drive transmission of the variety in which plural planet wheels are radially displaceable in orbital motion about an axially opposed pair of axially shiftable sun wheels and within an axially opposed pair of rotationally fixed reaction rings, said planet wheels having constant angular-contact with the wheels and rings of both pairs. An axially fixed pivotal reference between the sun wheels is used for linked connection of the sun wheels such that displacement of the respective sun wheels is always equal in magnitude but in opposite axial directions with respect to the axially fixed reference, thus assuring that the instantaneous radius of planet-wheel orbit between the sun wheel and reaction ring on one axial side of the fixed reference will at all times match the instantaneous radius of planet-wheel orbit between the sun wheel and reaction ring on the other axial side of the fixed reference.

18 Claims, 15 Drawing Figures

TRACTION-DRIVE TRANSMISSION

This invention relates to traction-drive transmissions of the variety in which plural planet wheels are radially displaceable in orbital motion about an axially opposed pair of axially shiftable sun wheels and within an axially opposed pair of rotationally fixed reaction rings, as of the variety disclosed in McLarty application Ser. No. 721,938, filed Sept. 10, 1976.

In the transmission of said application, Belleville springs are relied upon to axially urge the sun wheels together to develop preloaded constant rolling planet-wheel contact between a first sun wheel and a first reaction ring at a first axial zone of planet-wheel orbit, and between a second sun wheel and a second reaction ring at a second axial zone of planet-wheel orbit. Axially opposed angular-contact relations characterize planet-wheel engagements in the respective zones, so that a variable-speed transmission ratio is established between sun-wheel rotation and orbital rotation of the planet wheels, depending upon the relative axial position of the sun wheels. Under load conditions, considerable heat develops in the transmission of said application, and I believe that such heat is at least in part attributable to slightly different mechanical hysteresis characterizing planet-wheel orbital-radius response to instantaneous sun-wheel position (or reaction-ring position) at the respective zones of planet-wheel orbit; this condition is particularly aggravated when the preloading of the angular contact relationships relies on negative-rate Belleville springs.

It is accordingly an object of this invention to provide an improved traction-drive mechanism of the character indicated.

Another object is to provide such a mechanism characterized by more efficient operation for a given load condition.

A further object is to provide such a mechanism in which the above-noted mechanical-hysteresis effect is reduced to negligible magnitude.

A specific object is to provide such a mechanism in which the two opposed sun wheels are more assuredly maintained at equal and opposite axial offsets with respect to an axially fixed reference plane between the reaction rings.

Another specific object is to provide equalizer mechanism to reliably offset inherently unstable operating characteristics of a negative-rate Belleville spring loading mechanism of the character indicated.

A general object is to meet the above objects with relatively simple structure which does not materially add to the complexity of the overall mechanism but which substantially enhances the efficiency, life and power-transmitting capability of the mechanism.

Other objects and various further features of novelty and invention will be pointed out or will occur to those skilled in the art from a reading of the following specification in conjunction with the accompanying drawings, in which, for better understanding of the background of the invention, FIGS. 1 to 6 are directed to a transmission as provided by said McLarty application, and the remaining figures are directed to modifications of the invention. More specifically, in the drawings:

BACKGROUND AND ENVIRONMENT OF THE INVENTION

While the heart of the invention pertains to sun-wheel position-equalizer mechanism, as the same is involved in an overall transmission of the character indicated, it is helpful, by way of background, first to discuss a complete transmission of the prior art, the transmission of said McLarty application being taken as illustrative and being here described to the extent considered desirable for a better understanding of the principles and function of the improvements of the present invention. For convenience, and where applicable, the present description utilizes the same reference numerals as in said McLarty application, and reference may be had to said application for a fuller understanding of certain automatic functions and features which do not form part of the present invention.

Figure 1:
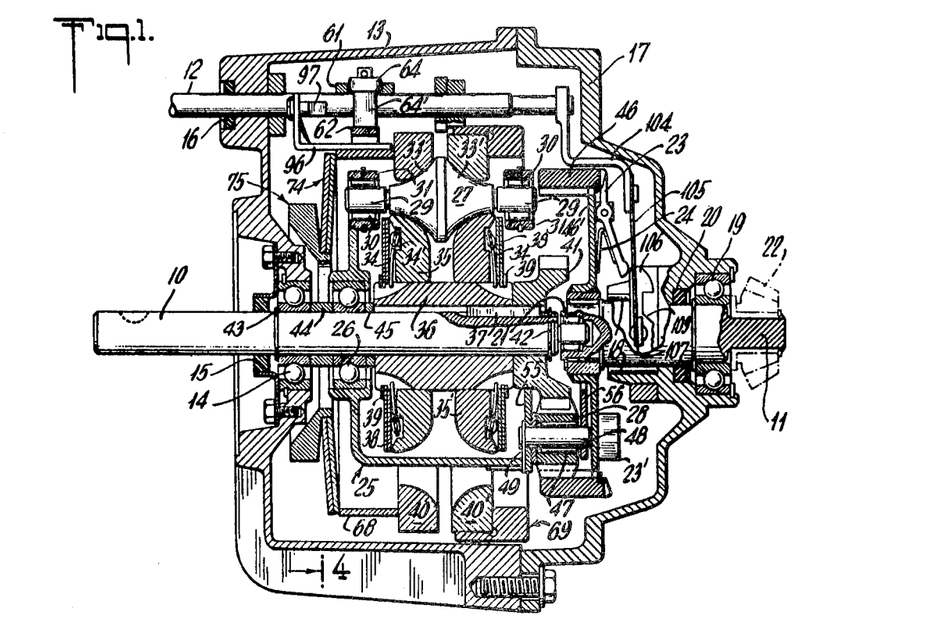
FIG. 1 is a partly broken-away longitudinal sectional view through a traction-drive transmission of the character indicated.

Referring initially to FIG. 1, a traction drive accepts continuous input rotation of a drive shaft 10 (as from an internal-combustion engine, not shown) and converts the same to forward drive, "hold" (stop), or reverse drive of an output shaft 11, all in accordance with the selective longitudinal positioning of a single control-rod element 12; the same control-rod element 12 is also selectively angularly shiftable to totally disengage the drive to a true "neutral", as for parking or towing conditions. The transmission will be described in the context of illustrative use on a small vehicle such as a lawn or garden tractor equipped as for bulldozer, snowplowing or the like duty, for which the engine may be in the range of 10 to 20 horsepower, but the principles of the invention will be understood to be of greater range of application.

The transmission is contained in a relatively small cup-shaped housing body 13, in the closed end of which the input shaft 10 is supported by an antifriction bearing 14 and is suitably sealed by means 15. The control element 12 is slidably supported through and sealed at 16 to an upper part of the closed end of body 13. The housing is closed by a removable end bell 17 having a central hub in which the output shaft 11 is shown supported by spaced needle and ball bearings 18–19 and is suitably sealed at 20. Shafts 10-11 include telescoping ends, with interposed needle-bearing means 21; and a load is symbolized by an output bevel gear 22.

Within the housing 13, and as part of a complete subassembly carried by the input shaft 10, a single planet-element carrier 25 is rotatably mounted by bearing means 26 on shaft 10; the carrier 25 angularly positions and carries plural planet rollers or wheels 27 and plural planet gears 28 in equal angularly spaced interlaced relation, thereby interconnecting traction-roller and meshing-gear planetary systems, to be described. Preferably, there are three planet rollers 27 and three planet gears 28. Each roller 27 has projecting rotary-support ends 29 riding in needle bearings 30 in slide members 31, and members 31 are in turn guided by radial guide slots 32 in the carrier 25, to be more fully described in connection with FIG. 3.

Each planet roller 27 is a single rigid element characterized by two like rolling-contact surfaces 33-33' which are truncated-toroidal and concave; surfaces 33-33' are sloped in generally axially-opposite and radially outward orientation, and the surfaces 33-33' may each be the surface of revolution of a circular arc, about an axis outside the circle from which the arc is taken.

The traction-roller planetary system comprises two like sun wheels 35-35' mounted for independent and keyed axial sliding upon a drive sleeve 36, keyed at 37 to the input shaft 10; coupling means in the form of an axially flexible and torsionally stiff plate 34 is shown as the means of establishing a keying connection from sleeve 36 to local key recesses 34' in the sun wheels 35-35'. The outer surfaces of wheels 35-35' are convex and of opposed slope orientation, each being preferably the surface of revolution of a circular arc, of radius less than that of the circular arc defining the respective planet surfaces 33-33'. Opposed Belleville washers or springs 38 are retained on sleeve 36 by snap rings 39 to establish a predetermined axially squeezing preload force of sun wheels 35-35' against the respective planet surfaces 33-33', thus applying a radially outward force which tends to outwardly displace the planet rollers 27. This displacement and force are opposed by similar axially inward squeezing force applied to two reaction rings 40-40', having antirotational support in housing 13. Such support and the control and variation of squeezing force action upon reaction rings 40-40' are the subject of some later discussion, in connection with control by rod 12 and by load-responsive downshift mechanism; but the subject is more fully discussed in said pending application. It suffices here to note that the inwardly facing rolling-contact surfaces of reaction rings 40-40' may, like those of sun wheels 35-35', each be defined as a surface of revolution of a circular arc of radius less than that of the circular arc defining the plural planet surfaces 33-33'.

The meshing-gear planetary system comprises a drive or sun gear 41, keyed at 37 to shaft 10 and axially retained by and between snap rings 42-43, along the sleeve 36, the inner rings of bearings 14-26, and axial spacers 44-45 as appropriate. Gear 41 is in constant mesh with the planet gears 28, and the latter are in constant mesh with the inwardly facing teeth of a ring gear 46 carried by a plate 26' that is keyed to the output shaft; for total-drive disengagement, ring gear 46 is freely rotatable on plate 46', and under drive conditions a clutch-dog rocker arm 23 pivotably mounted to plate 46' is spring-urged by means 24 to engage one of a plurality of dog slots in the adjacent end of ring gear 46.

Figure 2:
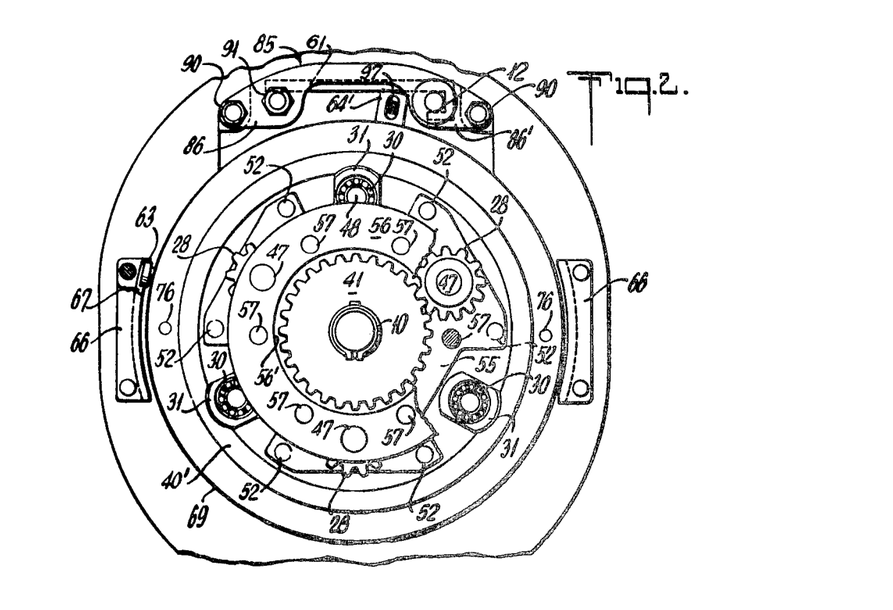
FIG. 2 is a right-end view of the mechanism of FIG. 1 after its right-end cover and output subassembly have been removed.
Figure 3:
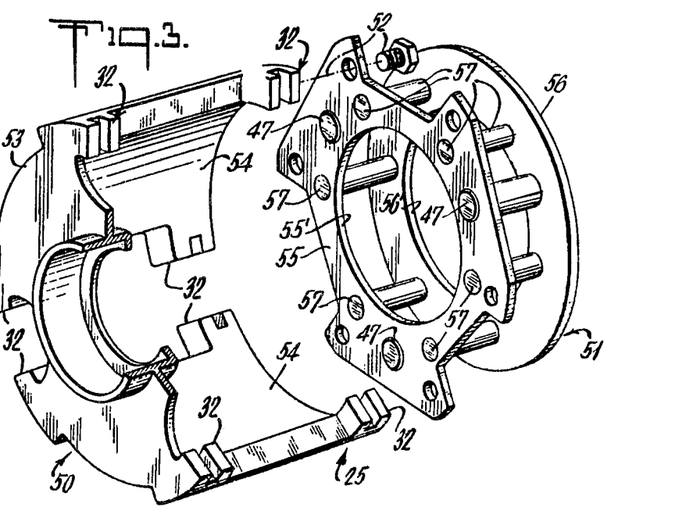
FIG. 3 is an exploded view in perspective, to show the planet-member carrier of the transmission of FIG. 1.

Each planet gear 28 is seen in FIGS. 1, 2 and 3 to be needle-bearing mounted at 47 to a support pin 48 that is fixedly retained by means 49 to part of the carrier structure 25.

The carrier 25 is seen in FIG. 3 to be essentially an assembly of a planet-roller retainer casting 50 and a planet-gear cage subassembly 51, bolted together by means 52. Basically, the casting 50 is a continuous plate-like ring at its bearing-supported end 53, and formed with integral arcuate angular segments 54 which extend axially and which are angularly spaced as needed for planet-roller clearance at the respective radially slotted guide locations 32. The planet-gear cage subassembly 51 comprises annular plates 55-56, axially spaced and retained by spacing rivets 57. The plate 55 has three lobe-like projections to enable securely bolted fastening of these projections to the respective body segments 54; the plate 56 is circular and suitably bored at angularly spaced locations for support of the three planet-gear pins 47. As best seen in FIGS. 2 and 3, the aligned central openings 55'-56' of plates 55-56 clear the teeth of gear 41.

Figure 4:
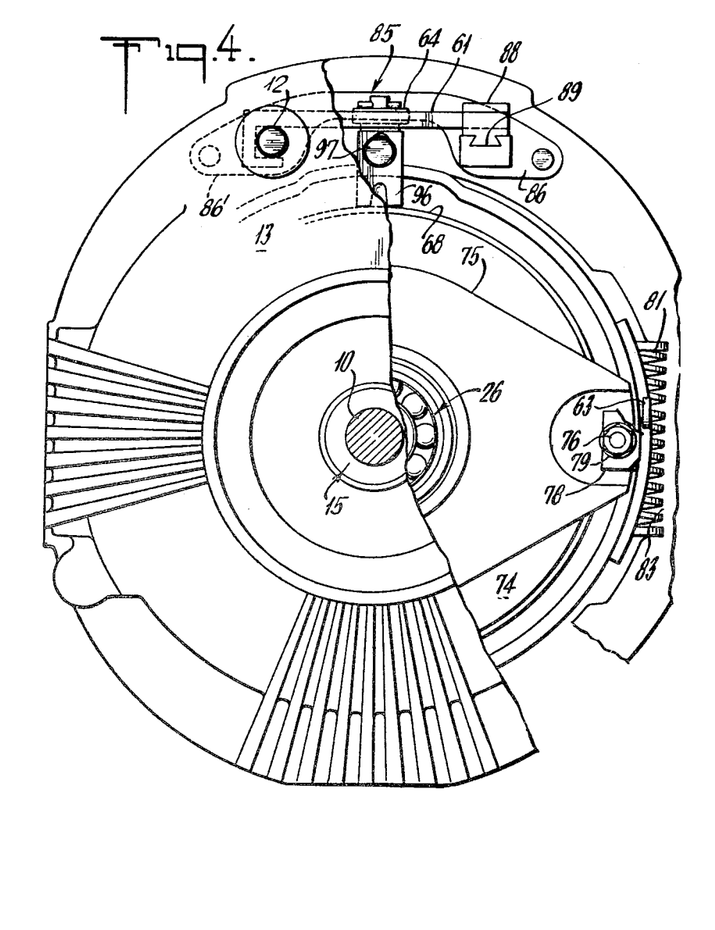
FIG. 4 is a left-end view of the mechanism of FIG. 1, with the housing partly broken-away to reveal control parts.
Figure 5:
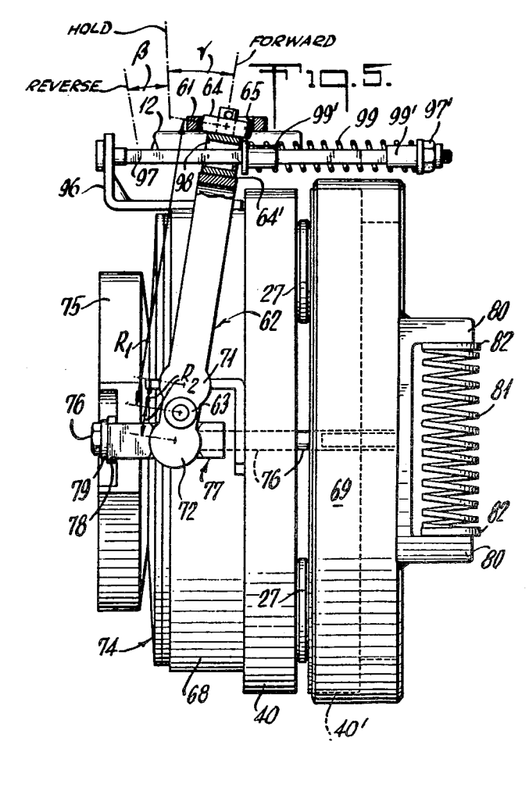
FIG. 5 is a view in side elevation, to show control parts.
Figure 6:
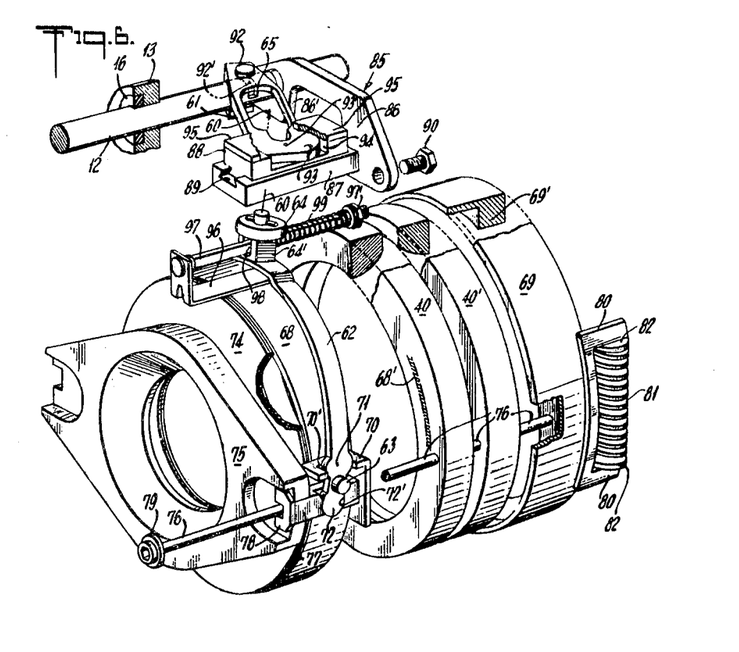
FIG. 6 is an exploded view in perspective of load-responsive shift-control mechanism of FIG. 1, partly broken-away to reveal an overall parts relationship.

Primary reference is made to FIGS. 4, 5 and 6 in describing mechanism whereby torsionally reactive antirotational support is provided for the reaction rings 40-40' and whereby a selectively applied control positioning of the shift rod 12 is subject to automatic lead-responsive correction. Basically, the mechanism comprises (A) a torsionally resilient suspension of an axially preloaded squeezing subassembly, shown in exploded array in the lower part of FIG. 6, and (B) cam-operated means referenced to the housing and associated with shift rod 12, shown as a subassembly in exploded offset (on the alignment 60) from the squeezing subassembly. The shift axis of rod 12 is longitudinal and parallel to the central axis of the planetary systems (i.e., to the axis of reaction rings 40-40'); and selected positioning of rod 12 is translated, via cam means 61 and a cam-following arcuate yoke 62 having pivoted reference at 63 to an axially fixed location in the housing, into corresponding changes in squeeze action. The yoke-pivot roll 63 is one of two, at substantially diametrically opposed locations on the respective arms of yoke 62, and a cam-follower roll 64 on a pedestal 64' at the midpoint of yoke 62 tracks shift-rod position via a guide or cam slot 65 in means 61. The frame reference for yoke pivots 63 will be seen in FIG. 2 to be provided by like diametrically opposed blocks 66, secured to housing 13, and each having an arcuate guide channel 67 in which the yoke pivot 63 is axially captive with a limited freedom for arcuate displacement.

The squeezing subassembly comprises spaced outer sleeve members 68-69 in axial abutment with the respective reaction rings 40-40'; the radius at which sleeve 68 thus abuts reaction ring 40 is suggested by shading between spaced arcuate phantom lines at 68' in FIG. 6, while the other reaction ring 40' is seated within a locating skirt and against a body portion 69' or sleeve 69. Sleeve member 69 includes spaced brackets 70, recessed at 70', to engage and track the instantaneous axial position of a first crank region 71 of each of the yoke arms, while a second crank region 72 of each of the yoke arms is used for similar axial-position tracking by the other sleeve member 69. Since regions 71-72 are on opposite sides of the axis of yoke-pivot means 63, the axial displacements of sleeves 68-69 are equal and opposite, in response to yoke actuation. Stiffly compliant Belleville-spring means 74 is relied upon to apply a squeezing preload of sleeves 68–69 upon rings 40–40′; as shown, the outer radial limit of spring means 74 acts (to the right, in the sense of FIGS. 1, 5 and 6) on sleeve 68, while a diametrically extending beam 74 receives equal and opposite action from the inner limit of spring means 74. Two tie rods 76 connect diametrically opposite ends of beam 75 to corresponding diametrically opposite locations on the sleeve body 69′, so that spring action on beam 75 is directly translated into spring action (to the left, in the sense of FIGS. 1, 5 and 6) upon sleeve 69. Each connection of a tie rod 76 to an end of beam 75 is seen in FIG. 6 to involve a tie-rod guide member 77 which comprises a longitudinal channel to receive and locate the associated tie rod 76, the channel body being in turn located in an outwardly slotted end of beam 75; flanges or ears 78 on each member 77 bear against beam 75 at the edges of each end slot thereof, and a washer 79 beneath the head of each tie rod 76 seats against the flanges 78 of the adjacent guide member 77. Finally, a local recess 72′ at a longitudinally central region of each guide member 77 coacts with yoke region 72 to respond to a shifted displacement of follower 64.

From the foregoing description of the squeezing subassembly, it will be understood that the instantaneous axial spacing of outer rings 40–40′ is always and solely a function of the instantaneous angular position of yoke 62 about its pivot means 63. The force with which such spacing (of rings 40–40′) is held will be that which is needed to achieve equilibrium with the instantaneous radially outward displacement force of planet rollers 27. The relatively great mechanical advantage attributable to the predominance of follower-crank radius $R_1$ over actuation-crank radii $R_2$ (see FIG. 5) means a correspondingly reduced reaction force as viewed along the displacement axis of control rod 12, but it is preferred to select the force characteristic of spring means 74 so as to provide a "preload" force in such opposition to the radially outward displacement force of planet rollers 27 that a nominal or "hold" position of yoke 62 is naturally retained. Thus, any adjusted shift of rod 12 from its "hold" position will only involve differential actuation of the respective ends of the squeezing subassembly, so that control-force magnitudes can be kept at relatively very low levels, involving minimum reaction upon the housing or upon the control mechanism.

A description of the squeezing subassembly is completed by noting that both tie rods 76 pass through aligned locating apertures in each of the reaction rings 40–40 and in the radial-plane wall of each of the brackets 70, thus assuring angularly keyed integrity of all parts of the subassembly. Additionally, the sleeve 69 is provided with diametrically opposed pairs of angularly spaced arms 80; between each pair of arms 80, a compressionally preloaded spring 81 is seated on pads or washers 82. A substantial fraction of each pad 82 projects radially outside arms 80 for torsionally resilient reacting engagement with adjacent side-wall regions of diametrically opposed local recesses 83 in housing member 17; these recesses may be seen in FIG. 4, but springs 81 have been omitted from FIG. 2 in order to permit viewing and identification of the guide blocks 66 for yoke-pivot action (already described).

The upper non-rotatable control portion of FIG. 6 comprises a mounting plate 85 of sheet metal and establishes a guide for rod 12 with enlarged outer ends 86–86′, to permit secure bolting, by means 90, to the interior of housing 13 (see also FIG. 2). Rod 12 has a circumferential groove for longitudinal-position tracking by the forked end (92′) of a pin 92 near the adjacent end member 61. A bracket arm 87 is secured to and projects from the mounting-plate enlargement 86, providing extending frame reference for a slide block 88; block 88 has a dovetail-guide (89) relation to arm 87, being adjustably positionable through selected setting of a lead screw as suggested at 91 in FIG. 2. The unpinned end 93 of control plate 61 is arcuately contoured for guidance between spaced shoulders 94 of a transverse groove in block 88, and capping plates 95 on the shouldered regions of block 88 sufficiently overlap the groove for captive retention of end 93 of the control member 61. Thus, control member 61 and its cam 65 span a range of angular positions of follower 64 about shafts 10–11, and throughout this range, cam-follower roll 64 is in constant tracking engagement with the cam 65.

An axial shifting of rod 12 will cause pin 92 to pivotally displace cam plate 61 about an instantaneous center 93′ of the rounded end 93 of plate 61, at a frame-reference longitudinal location determined by the setting at 91, for block 88 in its guide 89. Such displacement of plate 61 will change the instantaneous location of cam-follower (64) engagement along cam 65, thereby imparting a rotational displacement of yoke 62 about its pivot means 63, and thus directly changing the axial spacing and, therefore, the squeezing action of reaction rings 40–40′, as well as the preloaded condition of spring means 74. As already noted, each positional adjustment of the spacing of reaction wheels 40–40′ is accompanied by a positional shift of the planet rollers 27, in radial direction and extent, against the compressional preload of the sun wheels 35–35′ (due to the combined effects of springs 38). The springs means 74 merely relieves the net force encountered at control rod 12; the characteristic and preload level of spring means 74 are selected to substantially match or offset the instantaneous axial-force reaction from the preloading springs 38. In terms of control-rod (12) positioning, the net traction-drive ratio will always depend primarily upon (a) the current positional setting of control rod 12 and (b) such corrective modification of the pivoted angle of yoke 62 as is achieved for such setting by reason of load-reacting influence upon the antirotational springs 81 and the cam means 65–64. For the present illustration in which forward, stop ("hold") and reverse drives are selectively available, such availability of "hold" (zero output speed) applies under load as well as under no-load conditions; the control-rod position necessary to achieve "hold" will always be the same, but the cam follower 64 will assume various positions along the straight length of cam 65, depending upon the load condition. In any event, however, the above-noted spring reaction, between inner-spring means 38 and the balancing or offsetting effect of the outer-spring means 74, will always be operative upon the mechanism; and a preference is stated for the use of so-called Belleville springs at 38–74 because they have the property of exhibiting a negative-rate coefficient for axial deflections beyond that deflection at which their positive rate coefficient ends, it being preferred that such springs are under such preloaded condition as to assure operation at all times in the negative-rate portion of their respective coefficients, all as discussed in greater detail in said McLarty application.

For many applications, the mechanism as described will be perfectly satisfactory, but FIGS. 5 and 6 additionally illustrate a feature to provide stronger resilient force to urge the shift yoke 62 and its follower 64 away from the extreme-forward displacement positions. For such action, a mounting bracket 96 is fixed to sleeve 68 and retains the headed end of an elongate square-section guide rod 97, keyed against rotation by opposed walls of a radially slotted opening 98 in pedestal 64'; and a compression spring 99 on rod 97 is preloaded against pedestal 64', between bushings 99' and in accordance with preload adjustment of threaded means 97'. As yoke 62 is shifted to the right (forward speed selection), pedestal 64' is shifted to further compress spring 99, with the result that spring 99 will tend to return yoke 62 to the neutral or to a less-than-full forward speed position.

EMBODIMENTS OF THE INVENTION

Thus far, the description has been directed to an overall transmission, so that the various embodiments of the invention may be better understood as improved alternatives for certain components of the overall transmission. In this connection, FIGS. 7 to 11 are directed to a first form of the invention, when embodied in such a transmission; and in FIG. 7, various components will be recognized as having already been described in conjunction with the same or similar reference numbers.

Briefly, the invention provides an axially fixed reference point P along the axis of drive shaft 10 and between the opposed sun rings 35-35' and their associated preloaded Belleville springs 38, and this reference point P establishes the pivot axis for rocker-arm means R which is utilized to assure that sun rings 35-35' will at all times be positioned at equal and opposite axial offsets from the reference point P.

Figure 7:
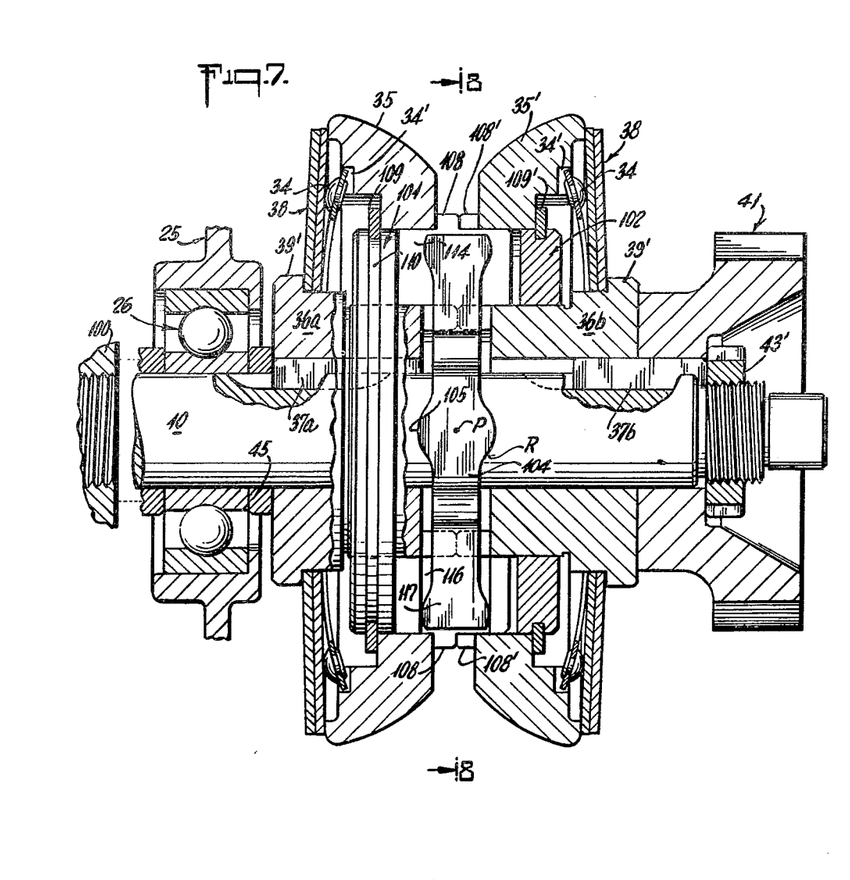
FIG. 7 is a fragmentary and partly broken-away longitudinal sectional view through sun-wheel position-equalizing mechanism for use in a portion of the transmission of FIGS. 1 to 6 and representing a first embodiment of the invention.
Figure 8:
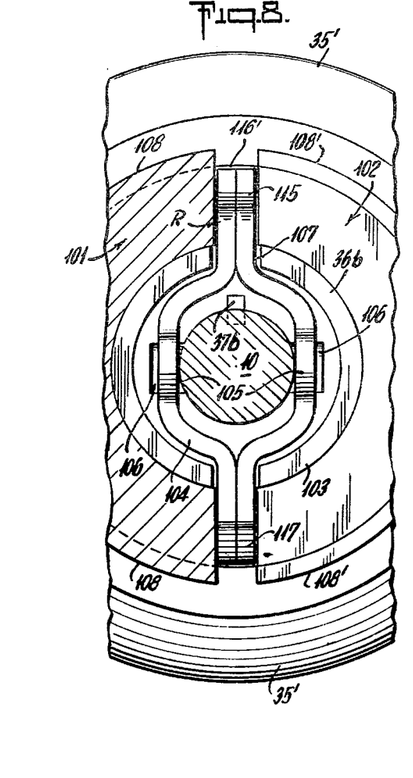
FIG. 8 is a fragmentary sectional view taken at the plane 8—8 of FIG. 7.

To accomplish the indicated relationship in the form of FIGS. 7 to 11, the opposed springs 38 are independently mounted to and retained by flanges 39' of sleeve members 36a-36b which are in clamped abutment, the clamp being symbolized at the left end of FIG. 7 by nut means 100 on shaft 10, and at the right end by nut means 43' set against the sun gear 41. As with sleeve 36 of FIG. 1, both sleeves 36a and 36b of FIG. 7 are keyed to shaft 10, at 37a-37b. Between the shoulder mounts for springs 38, sleeves 36a-36b are reduced and cylindrical to provide for guided axial sliding action of the respective sun wheels 35-35', and separate support members 101-102 are relied upon to mount the individual sun wheels 35-35' and to ride the cylindrical guide surfaces of sleeves 36a-36b.

Figure 9:
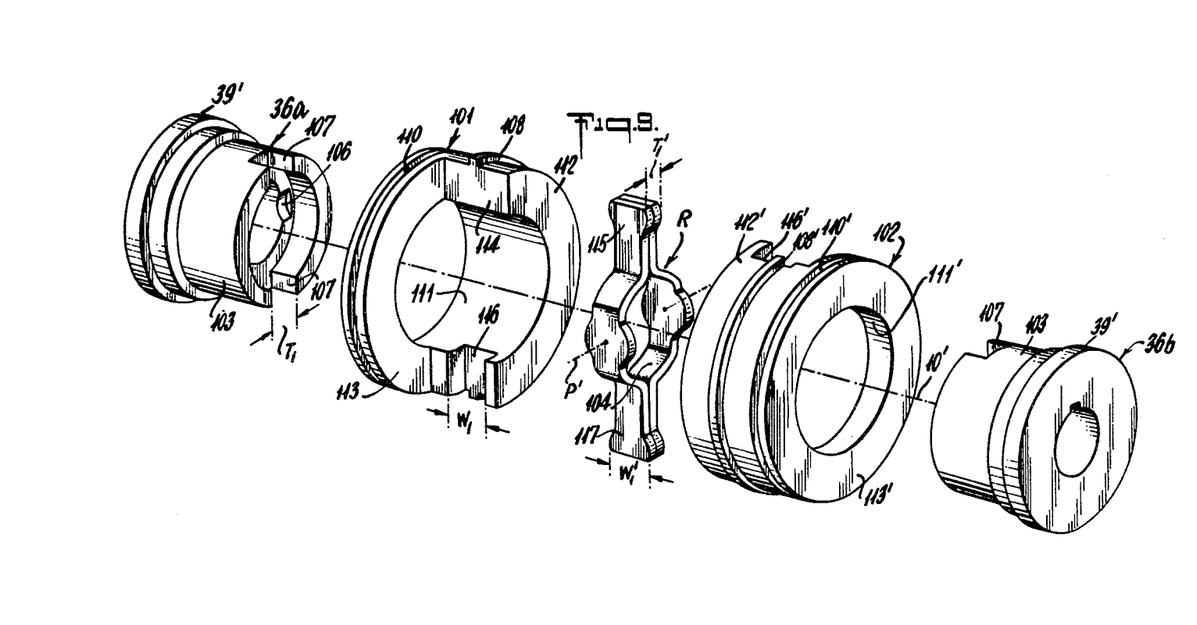
FIG. 9 is an exploded view in perspective of equalizer parts in the embodiment of FIGS. 7 and 8.
Figure 10:
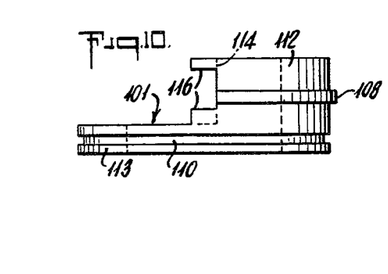
FIGS. 10 to 11 are respectively views in side and end elevation of one of the parts of FIG. 9.
Figure 11:
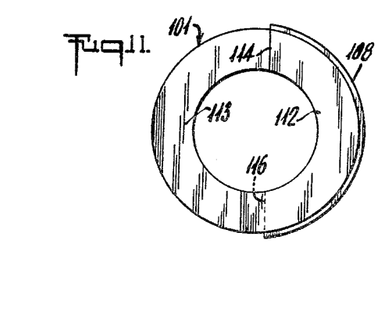

As best seen in FIG. 9, the sleeves 36a-36b are axially opposed duplicates of each other, each being characterized by an axially outer spring-retaining shoulder 39' and by a reduced axially inwardly extending cylindrical guide surface 103, for the indicated purpose of supporting bodies 101-102. The rocker arm R happens to be formed from two bowed strips of sheet metal, welded together at their ends; these strips are centrally bowed at 104 to clear the shaft 10 and have arcuate journal formations 105 to derive bearing support in local arcuate recesses 106 in the base of the counterbored inner axial ends of the respective sleeves 36a-36b. It will be understood that in the sleeve-clamped condition depicted in FIG. 7, the recesses 106 of sleeves 36a-36b are so oriented as to establish the fixed reference P as a fixed pivot axis (P', FIG. 9) for limited rocking action of arm R, the rocking axis P' intersecting the shaft axis 10' and being in keyed normal (transverse) orientation with respect to the shaft 10. To provide limited freedom for the indicated pivotal action, each of sleeves 36a-36b has diametrically opposed slot formations 107 to the depth of the counterbore, the slot widths $T_1$ exceeding the thickness $T_1'$ of the welded ends of the strip elements of rocker arm R.

Each of the bodies 101-102 is devised (a) to axially locate and radially position its own one of the sun wheels 35-35' and (b) to have independent axial connection to one (to the exclusion of the other) of the respective ends of the rocker arm R. For the locating and positioning purpose, a radial flange 108 (108') axially limits the axially inner end of the associated sun wheel, and snap-ring means 109 (109') in a peripheral groove 110 (110') axially retains the sun wheel against movement in the opposite direction; also the bore 111 is formed for slidable guidance on the sleeve surfaces 103. For the indicated purpose of connection to rocker arm R, each of the bodies 101-102 has a semicylindrical annular portion portion 112 (112'), integrally formed with a peripherally continuous ring portion 113 (113') in which the snap-ring groove 110 (110') is formed; these semicylindrical annular portions 112-112' are at 180-degree offset to permit their axially nested interlace, when assembled to the rocker arm R. The semicylindrical annular portion 112 terminates at one limit in a flat face 114 over which the adjacent end 115 of rocker arm R can only slide (i.e., cannot be axially engaged); the other limit of the semicylindrical annular portion 112 is radially slotted at 116 to an axial extent W, to axially engage the adjacent other end 117 of rocker arm R, said end 117 being arcuately formed to a diameter $W_1'$ to enable such engagement over the limited range of pivotal action of rocker arm R.

In similar fashion, the end 115 is axially engaged to a radial groove 116' in the semicylindrical annular portion 112' of body 102, so that bodies 101-102 are always interconnected by rocker arm R (at 116 to body 101, and at 115 to body 102), and with fixed axial reference at P' for their respective axial offsets from that radial plane which includes point P. Rocker arm R and its axial connections to both sun wheels (via bodies 101-102) are thus seen to stablize the otherwise free axial-floating action of the preloaded sun wheels 35-35' in their reacting engagements with the planet-roller and reaction-ring structure 27-40-40' of FIGS. 1 to 6.

Figure 12:
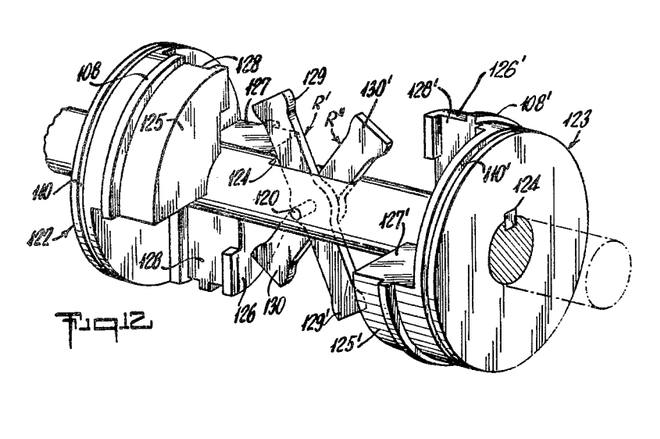
FIGS. 12 to 15 are exploded view in perspective of equalizer parts of further embodiments of the invention.

In the form of FIG. 12, the rocker arm structure is simplified at the expense of pivotally suspending the same via a pivot pin 120 extending through shaft 10 at the region of a diametrically open slot 121. Such an arrangement permits use of two like flat rocker arms R'-R'' in side-by-side relation through slot 121 and independently pivotable on the same pin 120. Further simplification results from elimination of sleeves 36a-36b, in that the fixed pivot relation is established by mounting pin 120 directly on shaft 10; having eliminated sleeves 36a-36b, the two bodies 122-123 may be slidably mounted to a suitably slotted single sleeve (analogous to sleeve 36 of FIG. 1), or, as shown, they may be mounted for axially guided slidable motion on shaft 10, the keyed relation being schematically suggested at 124, it being understood that suitable fixed reference is provided for the preloading means, as at 39' in FIG. 7.

The bodies 122-123 resemble those described at 101-102 except that instead of having axially overlapped semicylindrical annular portions (as at 112-112' in FIG. 9), each of the bodies 122 (123) has two diametrically opposed annular quadrant portions 125-126 (125'-226'), and the quadrant portions of the respective bodies are in angularly interlaced relation when assembled to the rocker-arm means R'-R".

For the case of body 122, the annular quadrant portions 125-126 each define part of the flange 108 by which the associated sun wheel is located, and the snap-ring groove 110 remains peripherally continuous, as in FIG. 9. In the plane defined by the axes of shaft 10 and pin 120, each of the annular quadrant portions 125-126 terminates in a flat surface 127, but in the plane of the angularly adjacent end of a rocker arm R' (R"), the quadrant portion includes a radial-groove formation 128 for axial engagement to the adjacent rocker-arm end. Thus, for body 122, quadrant portion 125 engages the end 129 of rocker arm R' at groove 128, while quadrant portion 126 engages the end 130 of rocker arm R" at its groove 128. In similar fashion, for body 123, quadrant portion 125' engages the end 129' of rocker arm R' at its groove 128' (not shown), while quadrant portion 126' engages the end 135' of rocker arm R" at its groove 128'. Both bodies 122 123 are thus seen to be interconnected by like rocker arms about or with respect to the same axially fixed location (pin 120), and the interconnections are such that any axial-positioning force to be transmitted from one body 122 (123) to the other body 123 (122) via arms R'-R" is applied with diametrical symmetry, about the axis of shaft 10.

Figure 13:
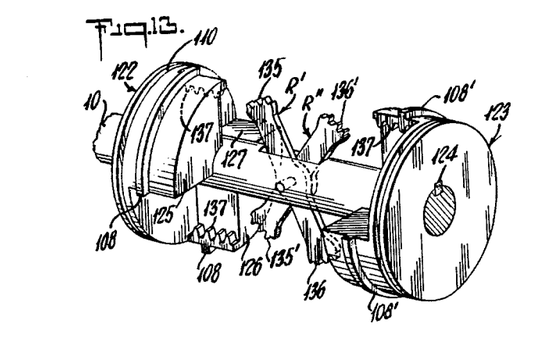

In the form of FIG. 13, much similarity will be recognized in comparison with FIG. 12, the important difference being that instead of the sliding rocker-arm connections to radial grooves (as at 128-128' in FIG. 12), the ends of rocker arms R'-R" of FIG. 13 are provided with one or more sector-gear teeth 135-136, preferably involute profile. The teeth 135 are in constant mesh with radially inward rack-tooth formations 137 of mating contour, the latter being formed in place of grooves 128-128' in the quadrant portions 125-126 (125'-126'), as will be understood.

Figures 14, 15:
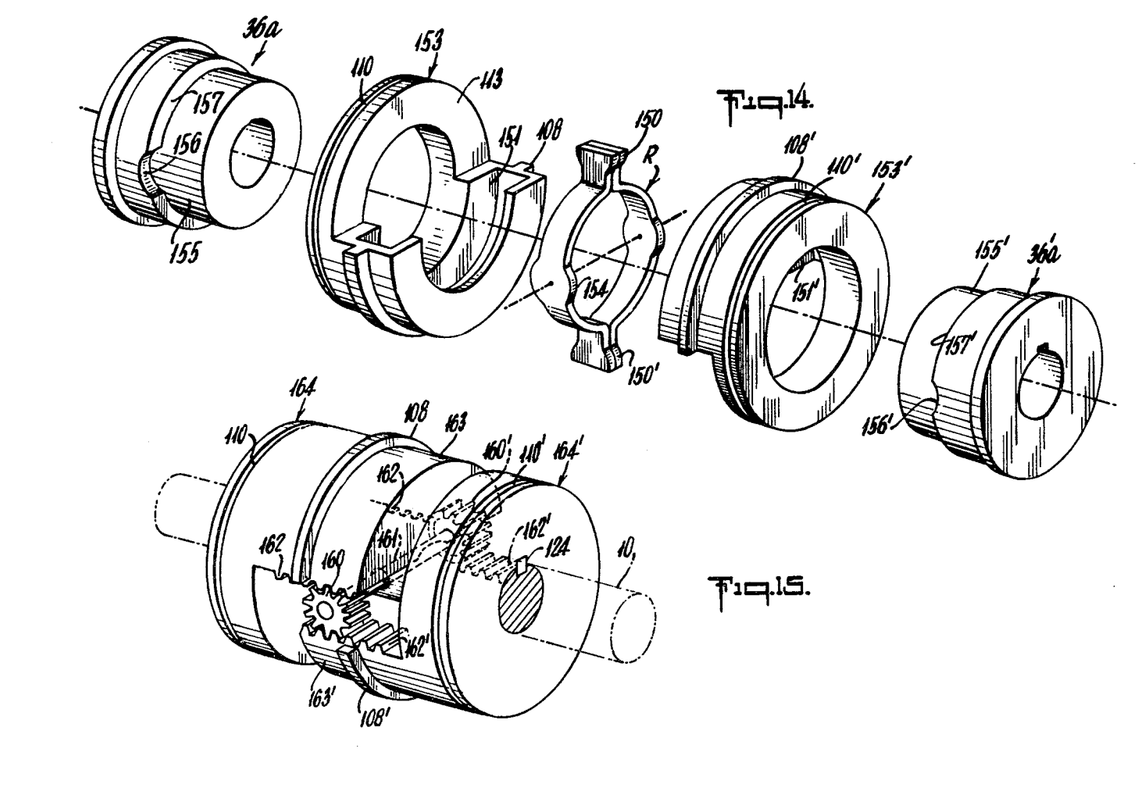

The form of FIG. 14 will be recognized for its general resemblance to that of FIGS. 7 to 11, the aspect being selected to correspond with that of FIG. 9. In effect, the mechanism of FIG. 14 utilizes a single rocker arm R, with single-tooth gear formations 150-150' at opposite ends; these single teeth mesh with single rack teeth 151-151', being the side wall of like semicylindrical inwardly facing grooves in the semicylindrical annular portions 152-152' of bodies 153-153'. The bowed central region of both halves of rocker arm R of FIG. 14 are again of arcuate contour (at 154) about the rocker-arm pivot axis, but these bowed halves are of larger diameter and greater spread, to clear the cylindrical guide part 155 (155') of each sleeve member, the arcuate contours 154 deriving pivot (journal) support in diametrically opposed recesses 156 (156') of the outer shoulder formation 157 (157') of each sleeve member. Greater pivot-axis stability results from the greater spread between opposed pivot supports for the rocker-arm of FIG. 14, and the counterbore complexity and slot formations 107 of FIG. 9 are avoided. Moreover, each of the rack-and-single-tooth engagements 151-150 (151'-150') may occur centrally within the arc of its particular groove 151 (151'), upon orienting bodies 153-153' at 90-degree displaced locations as shown, i.e., 90-degree displaced from the orientation of bodies 101-102 in FIG. 9; note the tooth-engagement region suggested by phantom outline 158. It will also be apparent that considerable simplification and more ready fabrication characterize the form of FIG. 14.

The form of FIG. 15 represents another rack-and-pinion version of the equalizer linkage of my invention. Basically, two like pinions 160 (160') are secured to opposed ends of the same pivot shaft 161, it being understood that shaft 161 establishes the fixed-pivot axis P' and may be journaled in the input shaft 10 (as at 120 in FIG. 12). But in contrast to other forms, the pinions 160 (160') are external to shaft 10, and no slot is needed in shaft 10. The pinions 160 (160') are in constant mesh with rack-tooth formations 162 (162') in the respective opposed arcuate annular portions 163 (163') of sun-ring supporting bodies 164 (164'), and in these bodies the shoulder and snap-ring groove formations for mounting the respective sun rings 35-35' will be recognized from their corresponding reference numbers 108-110 (108'-110'). The form of FIG. 15 will be seen to offer manufacturing simplification by reason of rack teeth 162 (162') extending along straight parallel chord intercepts, which define angular limits of the respective annular body portions 163 (163'). Moreover, the form of FIG. 15 offers the advantage of extended range of longitudinal displacement of the sun rings (being carried by bodies 164 (164'), as may be particularly useful when means other than Belleville springs are used to preload the sun rings into angular-contact engagement with planet rollers 27; thus preloading may be via hydraulic means (not shown) but utilizing a greater longitudinal displacement than is required for negative-rate operation of Belleville springs.

It will be seen that I have described relatively simple position-equalizing mechanisms for use in traction-drive systems of the character indicated, and meeting all stated objects. The linkage represented by rocker-arm interconnection of sun rings with respect to a fixed axial reference is found to equalize spring loading within the overall system, and to provide greater efficiency of power trasmission; less heat is generated because I believe my mechanisms provide greater assurance that sun-ring radii of roller contact will always be the same at any given time so that reaction-ring radii of roller contact may also be the same at any given time. The invention is particularly advantageous in the preferred circumstances wherein the preloading springs are in sufficiently preloaded displacement to enable operation in the negative-rate portion of their characteristic, it being noted that negative-rate springs in opposition have been found to be relatively unstable. The invention provides sufficient rigidity of axial reference to overcome the noted instability tendency, and the two inner races (sun rings) are always forced to move in symmetry about the axially fixed pivot point.

While the invention has been described in detail for the preferred forms shown, it will be understood that modifications may be made without departing from the scope of the invention.

What is claimed is:

1. In a traction-drive transmission, comprising a housing, a drive shaft journaled for rotation in said housing, two axially spaced sun wheels having keyed longitudinally relatively slidable support on said shaft, means carried by said shaft and axially pre-loading said sun wheels in the direction of relative axial approach to each other, plural like planet wheels axially interposed between and in rolling contact with said sun wheels, a planet-member carrier supported for rotation about the shaft axis and including spaced radial guides positioning said planet wheels on annularly spaced axes offset from the shaft axis and in said planet-member carrier, whereby each of said planet wheels may have at least a degree of generally radial freedom at its guided angular position with respect to said carrier, two axially movable reaction rings having anti-rotational support in said housing and in constant rolling contact with said planet wheels, an output shaft journaled for rotation in said housing, gear means differentially responsive to rotation of said impact shaft with respect to rotation of said planet-member carrier, and control means for varying the relative axial spacing of said reaction rings; the improvement in which the shaft support of said sun wheels includes diametrically aligned pivot means defining an axially fixed pivot axis through and normal to the input-shaft axis at a location intermediate said sun wheels, equalizer means having diametrically opposed radially projecting connection elements and including a central region connected to said input shaft by said pivot means, one radially projecting connecting element of said equalizer means having axially retaining connection to one to the exclusion of the other of said sun wheels, and the other radially projecting connecting element of said equalizer means having axially retaining connection to said other to the exclusion of said one of said sun wheels, whereby said pivot means provides a constant fixed reference for stabilizing like axial offsets of said sun wheels on opposite sides of the radial plane which includes the pivot axis.

2. The transmission of claim 1, in which said opposed projecting connection elements extend on an alignment which is in essentially a single plane which includes the axis of the input shaft.

3. The transmission of claim 1, in which said preloading means includes Belleville-washer means.

4. The transmission of claim 1, in which said equalizer means comprises rocker-arm means and in which the diametrically opposed connecting elements are opposed arms of said rocker-arm means.

5. The transmission of claim 4, in which the central region of said rocker-arm means comprises a yoke extending circumferentially about said input shaft, said pivot means connecting said yoke at diametrically opposed locations about said input shaft.

6. The transmission of claim 4, in which said input shaft is slotted diametrically through the axis of said pivot means, and in which said rocker-arm means extends through the slot region with limited freedom for angular motion about the pivot axis.

7. The transmission of claim 6, in which said rocker-arm means is one of two like rocker-arm means mounted in common on the pivot axis and extending through the slot region in side-by-side relation.

8. The transmission of claim 7, in which that projecting arm of said second rocker-arm means which is adjacent to said one arm of said first rocker-arm means has axially retaining connection to said other to the exclusion of said one of said sun wheels, and in which the projecting arm of said second rocker-arm means which is adjacent to said other arm of said first rocker-arm means has axially retaining connection to said one to the exclusion of said other of said sun wheels.

9. The transmission of claim 1, in which the shaft support of said sun wheels includes axially and angularly fixed bushing means carried by said shaft, said pivot means being a part of said bushing means.

10. The transmission of claim 9, in which the shaft support of one of said sun wheels is a first slidable bushing axially fixed to said one sun wheel and having limited freedom for axially guided movement along said fixed bushing means, and in which the shaft support of the other of said sun wheels is a second slidable bushing axially fixed to said other sun wheel and having limited freedom for axially guided movement along said fixed bushing means.

11. The transmission of claim 10, in which said connection-element connections to the respective sun wheels are via the slidable bushing associated therewith.

12. The transmission of claim 9, in which said preloading means includes Belleville-washer means provided in duplicate and in axially opposed relation, said fixed bushing means including first and second radial-flange means at equal axially offset locations on opposite sides of the radial plane of said pivot means, one of said Belleville-washer means being fixedly referenced to one of said flanges and having axially preloading engagement with its adjacent sun wheel, and the other of said Belleville-washer means being fixedly referenced to the other of said flanges and having axially preloading engagement with its adjacent sun wheel.

13. The transmission of claim 9, in which said fixed bushing means comprises two like bushing elements in opposed end-to-end abutment, means fixed to said shaft at opposite ends of said bushing means for axially fixing said bushing elements in mutually abutted relation, said pivot means being at least in part defined by each of said bushing elements.

14. The transmission of claim 1, in which the axially retaining connection of each connection element to its particular sun wheel is a rack-and-sector gear connection.

15. The transmission of claim 1, in which the axially retaining connection of each connection element to its particular sun wheel is a rack-and-pinion gear connection.

16. The transmission of claim 14, in which each rack-and-sector engagement is via a single tooth.

17. The transmission of claim 14, in which each rack-and-sector engagement is via plural teeth.

18. The transmission of claim 15, in which said rack-and-pinion connections are provided by two pinions, a pivot shaft fixedly connecting said pinions and passing diametrically through said drive shaft such that said pinions are external to said drive shaft at diametrically opposite locations, one sun wheel having two spaced rack formations engaged to one side of the respective pinions, and the other sun wheel having two spaced rack formations engaged to the other side of the respective pinions.

* * * * *